Oct. 10, 1961 E. W. RICHTER ET AL 3,004,093
CONTINUOUS PROCESS FOR MAKING SOLID ELECTROLYTE BATTERIES
Filed June 3, 1958
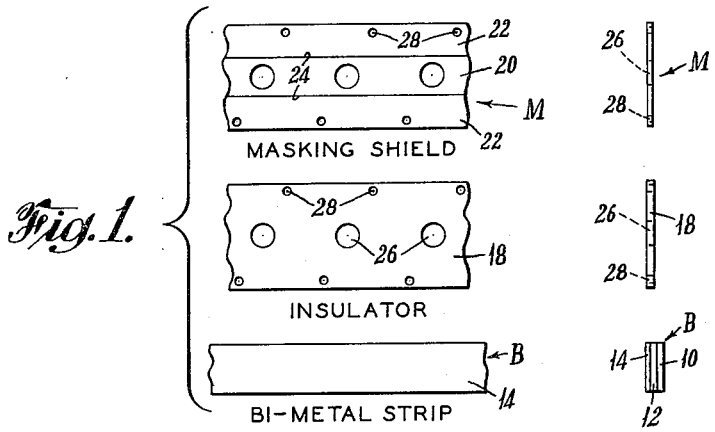
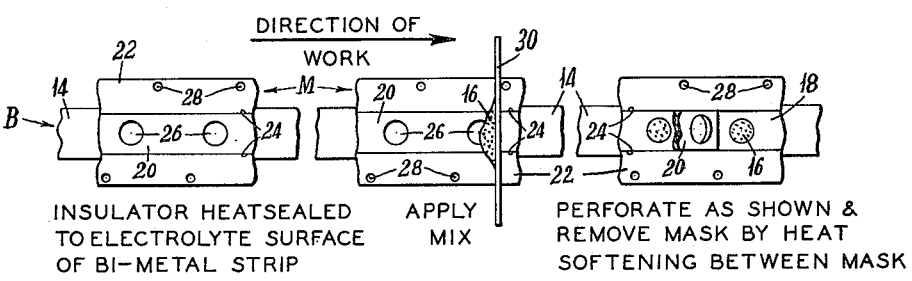
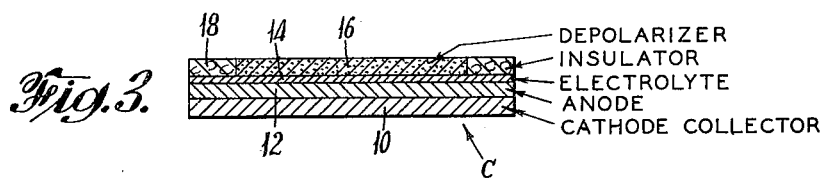
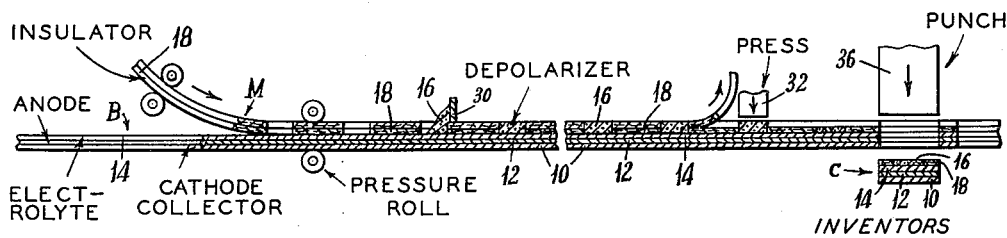
INVENTORS
ELMER W. RICHTER
DANIEL SHELLEK
HERBERT E. McMILLAN
GEORGE E. EVANS
BY
ATTORNEY

3,004,093
CONTINUOUS PROCESS FOR MAKING SOLID ELECTROLYTE BATTERIES

Elmer W. Richter, Lakewood, Daniel Shellek, Cleveland, and Herbert E. McMillan and George E. Evans, Rocky River, Ohio, assignors to Union Carbide Corporation, a corporation of New York
Filed June 3, 1958, Ser. No. 739,547
11 Claims. (Cl. 136—175)

This invention relates to a method of making primary galvanic cells and batteries composed of a stack of such cells and it more particularly relates to a new and improved method of accurately providing cathode-depolarizer mix in sufficient quantity adjacent the electrolyte of solid electrolyte, wafer type cells.

With the growth of the electronics industry and the many and varied new applications for galvanic cells, a need has arisen for cells having particular properties. One of the newer types of cell is one which utilizes a solid electrolyte free of any moisture. As these cells have been developed, a need for miniaturization has grown with them and so they have become increasingly smaller until the present variety, which in most instances is less than one millimeter in thickness and not more than a couple of centimeters in diameter.

With miniaturization in this field, problems have arisen concerning the accurate placement of cell elements with respect to each other. In the solid electrolyte wafer cell field, the placement of the cathode-depolarizer mix in the proper proportion within a ring of insulation adjacent the electrolyte of the cell has been a major source of concern. It is extremely important that the mix be properly and accurately placed in the cell since misaligned cell elements may cause short circuiting when the individual cells are stacked to form batteries, causing the rejection of the entire battery stack.

It is therefore the principal object of this invention to provide an improved method of manufacturing wafer type, primary galvanic cells and batteries comprising a stack of such cells. It is another object of this invention to provide a method of accurate placement of all cell elements on a supporting strip which itself is one of the elements of the cell. A further object of this invention is to provide a method of accurate placement of cell elements which is adapted to continuous operation. More specifically, it is an object of this invention to provide an improved method of incorporating cathode-depolarizer mix in the proper quantity adjacent the electrolyte in a wafer type, primary galvanic cell.

Basically this invention comprises the use of a laminate composed of an insulating film and a masking shield which has an aperture punched therein for receipt of cathode-depolarizer mix. After the laminate is formed and properly punched, the insulating film side thereof is joined to a solid electrolyte layer, which is adjacent the anode portion of a duplex electrode and the aperture is filled with cathode-depolarizer mix.

More specifically, this invention includes a method of producing wafer cells having a solid electrolyte, which method comprises forming a duplex electrode of a cathode-collector and anode, applying a solid non-aqueous electrolyte to the anode, forming the laminate as described above, joining the insulating film side thereof to the electrolyte, filling the aperture in the laminate with cathode-depolarizer mix, removing the masking shield, compressing the cathode-depolarizer mix, and cutting out the cell thus formed leaving a ring of insulating film around the cathode-depolarizer mix.

This invention will be best understood by reference to the accompanying drawing in which:

FIG. 1 is an exploded plan view and side elevation of elements adapted to be used in the method of the invention;

FIG. 2 is a plan view of various stages in the assembly of cells in accordance with the method of the invention;

FIG. 3 is an enlarged vertical section of a single cell made in accordance with the invention; and FIG. 4 is a diagrammatic representation of a method of cell assembly embodying the invention.

The method of the invention lends itself admirably to the continuous production of solid electrolyte cells wherein a strip of electrode material is utilized to support the various elements of the cells placed thereon in successive operations at different stations. A typical cell assembly is illustrated in FIG. 3 of the drawing showing a cell composed of a cathode-collector 10, having a coating of anode 12 thereon, and provided with a solid electrolyte layer 14 on the anode coating. The cathode-depolarizer mix 16 is retained within a ring of insulation 18 joined to the electrolyte 14.

An important feature of the method of cell assembly embodying this invention is the use of a laminate composed of an insulating film and a masking shield. The method, described with reference to FIGS. 1, 2 and 4 of the drawing comprises the formation of a laminate, as best shown in FIG. 1, composed of a masking shield M and an insulating film 18, which is provided with at least one aperture 26. The masking shield M may be a single element but it is preferably divided into a central portion 20 and marginal portions 22, suitably by slits 24. Further, the laminate is preferably provided with small registry holes 28, suitably in the marginal portions 22 of the masking shield M and near the outer edge of the insulating film 18. A bimetal strip B, serving as a duplex electrode, comprises a cathode-collector 10 and an anode 12. A solid electrolyte 14 is provided on the anode 12, and the insulating film portion 18 of the laminate is joined to the electrolyte 14. Suitably, the cathode-collector may be coated with a carbonaceous conductive material such as that used in the manufacture of conventional flat cells in order to improve conduction.

As best shown in FIGS. 2 and 4, the cathode-depolarizer 16 is applied to the solid electrolyte layer 14, through the aperture 26 and in sufficient quantity to fill it, by conventional means such as a knife edge 30. The central portion 20 of the masking shield M is then removed along the slits 24, the cathode-depolarizer mix 16 is compressed by conventional means, suitably a piston-type press 32 or ordinary calender rolls, and the cell C thus formed is cut out by punch 36, allowing a border of insulation 18 to remain around the mix 16. The cell C is then stacked in series relation with others of its kind, the cathode-depolarizer mix 16 of one cell being adjacent to the cathode-collector 10 of the next cell.

In the practice of this invention as broadly discussed above, particular attention should be paid to the laminate of masking material and insulating film. It is important that the thickness of the masking shield be chosen to provide sufficient aperature depth, to be filled with cathode-depolarizer mix, so that when the masking shield is removed and the mix is compressed, it will protrude slightly above the insulating film in order to insure intimate contact between the mix and the cathode-collector of the next cell in the battery stack. The insulating film of course should not conduct electricity and should be inert to any possible chemical action of the cell elements. A layer of glassine paper has been chosen for the insulating film, but it may readily be seen that many other materials, as for example, polyethylene, vinyl polymers or other plastic films and various textile materials suitably impregnated to be rendered resistant to the chemical action of the cell, may similarly be utilized to advantage. The masking shield to be used in the practice of this invention is only restricted by its thickness, as discussed above, and almost any material, including those which exhibit electrical conductivity or are insulators, may be used provided the material is self supporting in the thickness desired. For convenience, a layer of glassine paper similar to that used for the insulating film has been effectively used.

The duplex electrode system, described above, is preferably stainless steel coated with silver. However, a carbon cathode-collector or other conductive material, which will not react or alloy with the anode or depolarizer mix, may readily be substituted for the stainless steel as referred to herein. Similarly, the anode may be chosen from among the wide variety known to the art and a corresponding suitable electrolyte applied thereto. It is an important consideration of this invention that the duplex electrode structure utilized must be self supporting and must be sufficiently rigid to support the other cell elements which are deposited thereon in the subsequent assembly of the cell.

The adhesives to be used in laminating the masking shield to the insulating film and joining the insulating film to the electrolyte must be chosen so that they are temperature sensitive and have different softening points. The laminating adhesive should have a lower softening point than the joining adhesive since the masking film must be removed without softening the adhesive which joins the insulating film and electrolyte. Various particular heat sensitive adhesives will suggest themselves to those skilled in the art, polyvinylmethylether and styrene-butadiene copolymer being one example of each kind (low and high softening point) of adhesive found to be useful.

As a specific example of the practice of this invention, wafer type, solid electrolyte cells of the silver/silver iodide/vanadium pentoxide system were made and stacked into batteries. A bimetal strip of silver and stainless steel was prepared, and the silver surface was tarnished by reaction with iodine vapor to provide silver iodide electrolyte. This tarnished bi-metal strip, serving as a duplex electrode having an electrolyte provided thereon, acted as a carrier during subsequent operations. An insulating film of glassine paper was laminated, by means of a low softening point, temperature sensitive adhesive, suitably a solution of polyvinylmethylether, to a masking shield, also of glassine paper film, which was in three longitudinal portions suitably separated by slits. The solvent was evaporated and the laminate was punched, by means of a rotary die, to form apertures in the central portion, for receipt therein of cathode-depolarizer mix, and small registry holes near the outer edges thereof, for registration of subsequent operations. The film and shield were sufficiently wide to allow the small holes to be positioned outside of the bimetal strip, which was four cell diameters wide, but which may be any width desired, only the number of apertures desired determining the width of the strip. The insulating film was then joined to the silver iodide layer on the bimetal strip by means of a coating of a high softening point, temperature sensitive adhesive, suitably a butadiene-styrene copolymer. The cathode-depolarizer mix, prepared by mixing 5 parts of silver iodide, 10 parts vanadium pentoxide, 2 parts micronized graphite, 3 percent bentonite as a binder and a small amount of water, was applied to fill the apertures in the laminate using a knife edge, and the central portion of the masking shield was then removed by the application of heat of a temperature intermediate between the softening temperatures of the adhesives. The cathode-depolarizer mix, which then protruded above the surface of the insulator film, was dried and compressed by conventional means, suitably calender rolls, and the cell thus formed was cut out also by conventional means, suitably a punch. In cutting out the cell, a border of insulation was left around the cathode-depolarizer mix.

The small holes punched near the edges of the adhered films were geared to the punch, and may be geared to the press if a piston type is used. The amount of cathode-depolarizer mix metered into the cavity, determined by the thickness of the film and shield laminate, was controlled so as to allow it to protrude slightly above the level of the insulating film after it was compressed in order that good contact could be established between the cathode-depolarizer mix of one cell and the cathode-collector of the next succeeding cell in the battery.

What is claimed is:

1. A method of making a primary galvanic cell comprising forming a duplex electrode composed of an anode and a cathode-collector, providing electrolyte on said anode, adhering an insulating film to a masking shield to form a laminate, punching said laminate to form an aperture therein, joining said insulating film to said electrolyte, fitting said aperture with cathode-depolarizer mix, removing said masking shield, and compressing said cathode-depolarizer mix.

2. A method of making a primary galvanic cell comprising forming a bi-metal electrode composed of an anode and a cathode-collector, providing a solid non-aqueous electrolyte on said anode, laminating an insulator to a masking shield, said insulator and said shield having a coincident aperture therein, joining said insulator to said electrolyte, filling said aperture with cathode-depolarizer mix, removing said masking shield and compressing said mix.

3. A method of making a primary galvanic cell comprising forming a bi-metal electrode composed of a silver anode and a stainless steel cathode-collector, providing silver electrolyte on said anode, laminating a glassine paper insulator to a glassine paper masking shield, said insulator and said shield having a coincident aperture therein, joining said insulator to said electrolyte, filling said aperture with cathode-depolarizing mix, removing said masking shield and compressing said mix.

4. A method of making a battery of primary galvanic cells which method comprises forming a bi-metal strip composed of an anode and a cathode-collector, providing an electrolyte on said anode, adhering an insulating film to a masking shield, composed of a central portion and marginal portions, to form a laminate, punching said laminate to form apertures in the central portion thereof, joining said insulating film to said electrolyte, filling said apertures with cathode-depolarizing mix, removing said central portion of said masking shield, compressing said cathode-depolarizer mix, cutting out cells from the assembly thus formed leaving a border of said insulating film around said cathode-depolarizer mix, and stacking said cells to form a battery.

5. A mehod of making a battery of primary galvanic cells which method comprises forming a bi-metal strip composed of an anode and a cathode-collector, providing an electrolyte on said anode, adhering an insulating film to a masking shield, composed of a central portion and marginal portions divided by slits to form a laminate, punching said laminate to form apertures in the central portion thereof, said laminate being of a width greater than the width of said bi-metal strip, overhanging portions of said laminate having a multiplicity of registry holes therein, joining said insulating film to said electrolyte, filling said apertures with cathode-depolarizer mix, removing said central portion of said shield along said slits, compressing said cathode-depolarizer mix, cutting out cells from the assembly thus formed leaving a border of said insulating film around said cathode-depolarizer mix, and stacking said cells to form a battery.

6. A method of making a battery of primary galvanic cells comprising forming a bi-metal strip composed of an anode and a cathode-collector, providing an electrolyte on said anode, adhering an insulating film to a masking shield, composed of a central portion and marginal portions joined by perforations, to form a laminate, punching said laminate to form apertures in the central portion thereof, joining said insulating film to said electrolyte, filling said apertures with cathode-depolarizer mix, removing said central portion of said masking shield along said perforations, compressing said cathode-depolarizer mix sufficiently to allow a minor portion thereof to protrude past said insulating film, cutting out cells from the assembly thus formed leaving a border of insulating film around said cathode-depolarizer mix, and stacking said cells to form a battery.

7. A method of making a battery of primary galvanic cells comprising forming a bi-metal strip composed of an anode and a cathode-collector, providing an electrolyte on said anode, adhering an insulating film to a masking shield, composed of a central portion and marginal portions, by means of a first heat sensitive adhesive, to form a laminate, punching the central portion of said laminate with at least one aperture, and the marginal portions of said laminate with small registry holes, joining said film to said electrolyte by means of a second heat sensitive adhesive having a higher softening point than said first heat sensitive adhesive, filling said aperture with cathode-depolarizer mix, removing said central portion of said masking shield, compressing said cathode-depolarizer mix, cutting out cells from the assembly thus formed leaving a border of said insulating film around said compressed mix, and stacking said cells to form a battery.

8. A method of making a battery of primary galvanic cells comprising forming a bi-metal strip composed of a silver anode and a stainless steel cathode-collector, providing a silver iodide electrolyte on said anode, adhering an insulating film to a masking shield, composed of a central portion and contiguous marginal portions, to form a laminate, punching said laminate to form apertures in the central portion thereof and registry holes in the marginal portions thereof, joining said insulating film to said electrolyte, filling said apertures with cathode-depolarizer mix comprising silver iodide, vanadium pentoxide, graphite, bentonite and water, removing said central portion of said masking shield, compressing said mix sufficiently to allow a minor portion thereof to protrude above said film, cutting out cells from the assembly thus formed leaving a border of insulating film around said mix, and stacking said cells to form a battery.

9. A method of making a battery of primary galvanic cells comprising forming a bi-metal strip composed of a silver anode and a stainless steel cathode-collector, providing a silver iodide electrolyte on said anode, adhering a glassine paper insulating film to a glassine paper masking shield, composed of a central portion and marginal portions divided by slits, to form a laminate, punching said laminate to form apertures in the central portion thereof and registry holes in the marginal portions thereof, joining said insulating film to said electrolyte, filling said apertures with cathode-depolarizer mix comprising silver iodide, vanadium pentoxide, graphite, bentonite and water, removing said central portion of said masking shield along said slits, compressing said mix sufficiently to allow a minor portion thereof to protrude past said film, cutting out cells from the assembly thus formed leaving a border of insulating film around said mix, and stacking said cells to form a battery.

10. In the method of making a solid electrolyte, primary galvanic cell which comprises forming a duplex electrode of an anode and a cathode-collector, applying an electrolyte on said anode, placing cathode-depolarizer mix on said anode and surrounding said depolarizer mix with a ring of insulating film; the improvement comprising adhering a masking shield to said insulating film to form a laminate, punching an aperture in said laminate, joining said insulating film to said electrolyte carrying duplex electrode, filling said aperture with said cathode-depolarizer mix, removing said masking shield and compressing said depolarizer mix.

11. In the method of making solid electrolyte, primary galvanic cells which method comprises forming a duplex electrode of an anode and a cathode-collector, applying an electrolyte on said anode, placing cathode-depolarizer mix on said anode and surrounding said depolarizer mix with a ring of insulating film; the improvement comprising adhering a masking shield, composed of a central portion and marginal portions, to said insulating film by means of a first heat sensitive adhesive to form a laminate, punching apertures in said laminate, joining said insulating film to said electrolyte carrying duplex electrode by means of a second heat sensitive adhesive having a softening point higher than said first adhesive, filling said apertures with said cathode-depolarizer mix, removing said central portion of said masking shield by the application of heat of a degree intermediate the softening points of said adhesive, compressing said depolarizer mix, and cutting out the cells thus formed leaving a ring of insulating film around said cathode-polarizer mix.

References Cited in the file of this patent

UNITED STATES PATENTS

| | | |
|---|---|---|
| 2,666,802 | Woodring et al. | Jan. 19, 1954 |
| 2,778,754 | Shorr | Jan. 22, 1957 |
| 2,844,641 | Lang et al. | July 22, 1958 |
| 2,894,052 | Evans | July 7, 1959 |

UNITED STATES PATENT OFFICE
CERTIFICATE OF CORRECTION

Patent No. 3,004,093                      October 10, 1961

Elmer W. Richter et al.

It is hereby certified that error appears in the above numbered patent requiring correction and that the said Letters Patent should read as corrected below.

Column 4, line 33, after "silver" insert -- iodide --; line 61, after "strip," insert -- the --; column 6, line 41, for "adhesive" read -- adhesives --.

Signed and sealed this 8th day of May 1962.

(SEAL)
Attest:

ERNEST W. SWIDER
Attesting Officer

DAVID L. LADD
Commissioner of Patents